United States Patent
Farina

[11] Patent Number: 5,918,725
[45] Date of Patent: Jul. 6, 1999

[54] MACHINE FOR POSITIONING AND LEVELING PLATES FOR ELECTRIC ACCUMULATORS

[75] Inventor: Pietro Farina, Villafranca, Italy

[73] Assignee: Sovema S.r.l., Villafranca, Italy

[21] Appl. No.: 08/838,031

[22] Filed: Apr. 22, 1997

[30] Foreign Application Priority Data

May 30, 1996 [IT] Italy ................................ VR96A0054

[51] Int. Cl.⁶ ................................................. B65G 47/24
[52] U.S. Cl. ............................................................ 198/415
[58] Field of Search ............................ 198/415, 457.03, 198/410, 394, 456

[56] References Cited

U.S. PATENT DOCUMENTS

| | | | |
|---|---|---|---|
| 2,781,886 | 2/1957 | Stelzer | 198/415 X |
| 2,813,617 | 11/1957 | Sheetz | 198/415 X |
| 3,321,062 | 5/1967 | Brockmuller et al. | 198/415 |
| 5,195,627 | 3/1993 | Wyman | 198/415 X |
| 5,400,896 | 3/1995 | Loomer | 198/415 |

*Primary Examiner*—James R. Bidwell
*Attorney, Agent, or Firm*—Browdy and Neimark

[57] ABSTRACT

A machine for positioning and leveling plates for electric accumulators, is operationally arranged downstream of a machine for separating lead grids (2), initially formed by a continuous strip (5), into pairs of plates (11). The machine in question is substantially provided with an upstream section (16), a central section (20) and a downstream section (17) associated respectively with first (18), second (21) and third (22) conveying devices. The first conveying device (18) removes the plates (11) from the separating machine (2) and transfers them, through a compression station (19) to level the plates (11), to the central section (20). The second conveying device (21) transfers the plates (11) from the first conveyor (18) to the third conveying device (22) and includes two diverging series of parallel belts (31, 32), each with its own feeding speed, which carry out additional plate handling operations: mutual spacing of the plates (11) of each pair in a transverse direction (Y) substantially perpendicular to their direction of feeding (X); rotation (Ω) of each plate in its positional plane; alignment of a front part (15) of the plates (11) of each pair, to arrange them in a condition for easy collection. Finally, the third conveyor (22) removes the plates (11) from the central section (20) and conveys them along the downstream section (17) of the positioning and leveling machine.

18 Claims, 4 Drawing Sheets

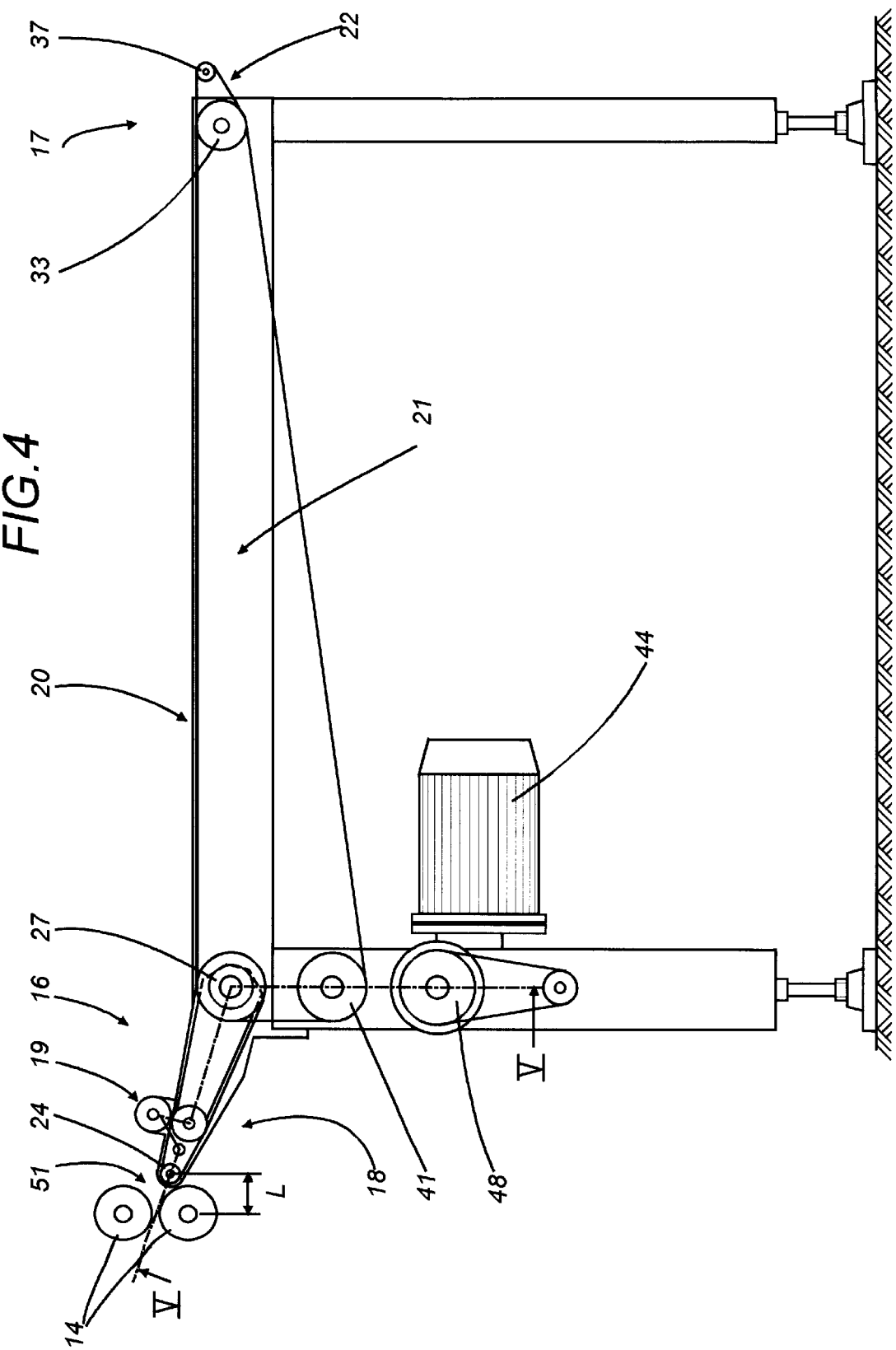

1

MACHINE FOR POSITIONING AND LEVELING PLATES FOR ELECTRIC ACCUMULATORS

BACKGROUND OF THE INVENTION

The present invention relates to a machine for positioning and leveling plates for electric accumulators, to be arranged within the process for production of the plates themselves.

The machine in question is designed to be used downstream of a machine for separating lead grids and upstream of an annealing furnace prior to stacking and final storage of the plates on pallets.

As is known, the grid separating machine is intended for dividing a continuous strip of plates into pairs of plates separated from one another, by means of the use of two parallel counter-rotating rollers provided with cutters. Upon leaving the separating machine, the plates are divided, curved by the action of the aforementioned rollers, staggered with respect to one another and arranged in a fairly disordered manner. The lack of alignment of the plates upon leaving the machine is an inevitable consequence of the production process which is intended to produce plates with lugs for the electric contacts which, depending on requirements, must be able to be formed in different positions along one side of the plates themselves.

At present, in accordance with the known art, use is made of a positioning and leveling machine having the following: an upstream section, arranged in the vicinity of the separating machine for removing the outgoing plates; a downstream section, arranged in the vicinity of the annealing furnace for charging thereof; and a central section designed to perform conveying and mutual spacing of the plates of each pair of plates.

This machine, which is of a known type, involves the use, in the upstream section, of a first motorized conveyor belt able to convey the plates underneath a compression roller which pushes them against the rigid surface of the conveyor belt, causing leveling thereof.

Advantageously, it also involves the presence of an extraction roller with a small diameter to be inserted into the vicinity of the separating machine outlet in order to remove the plates in the vicinity of the two rollers provided with cutters. The central section of this known machine is associated with two diverging series of belts designed to transfer the pairs of plates from the outlet of the compression roller to the downstream section of the machine, performing at the same time spacing of the individual plates which make up each pair.

In order to connect the conveyor belt to the two series of belts, use may be made of a connecting roller.

The downstream section is provided with conveying means designed to remove the plates from the aforementioned central section and transfer them to the furnace charging hatch. These conveying means may consist of either a second conveyor belt or a series of transfer rollers.

This conveyor design, already known and briefly described above, has numerous drawbacks.

First of all, it involves, for transfer of the plates from the upstream section to the downstream section, the use of different conveying means which cause small displacements of the plates themselves when passing from one conveying means to another. This results in disordered positioning of the plates at the outlet of positioning and leveling machine. In fact, especially during the transfer between one conveyor belt and a belt group, small jumping movements occur and disturb the arrangement of the plates, causing uneven transfer thereof onto the conveyor means which is located downstream. This results in difficulty in stacking the plates during a final collection stage (for example at the annealing furnace outlet), whether a manual collection method is used or automated collection performed.

A first requirement which arises, therefore, during the final collection stage of the production process is that the plates should be adequately ordered and oriented in a suitable manner so as to make quicker and easier, and hence less costly, stacking and storage thereof onto pallets.

As stated above, upon leaving the positioning and leveling machine of the known type, the pairs of plates are spaced and staggered with respect to one another, with the front part not aligned. Moreover, the plates of each pair which emerge from the separating machine have their front part inclined towards the outside of the machine itself. This occurs because the aforementioned two rollers provided with cutters grip the central part of the continuous strip of plates more firmly than the lateral parts.

Another disadvantage of the positioning and separating machine of the known type also consists in the fact that there are no suitable contrivances for ensuring lateral alignment and frontal lining-up of the plates which allows the latter to be positioned, upon leaving the machine itself, in an ordered condition designed to ensure easy collection thereof.

An essential object of the present invention is therefore that of overcoming the drawbacks of the known art, providing a machine for positioning and leveling plates for electric accumulators which allows pairs of plates to be conveyed from its upstream section to its downstream section, causing spacing thereof perpendicular to the direction of feeding, alignment of the front part, rotation in the positional plane and leveling.

Another object of the present invention is that of performing the aforementioned leveling of the plates in the vicinity of the outlet of a separating machine, carrying out gripping thereof before they have emerged completely from the separating machine, in order to prevent the presence of connecting elements between the plates (due to an imperfect cutting operation of the separating machine) from disturbing the correct arrangement of the plates themselves leaving the separating machine.

Another object of the machine in question is that it should be reliable and safe and that the plates should be arranged at its outlet in an ordered condition such that they can be easily collected, envisaging moreover the use of conveying means which are able to transfer the plates without disturbing the arrangement thereof as a result of the jumping movements.

SUMMARY OF THE INVENTION

These objects and others are all achieved by the positioning and leveling machine in question, which comprises an upstream section, a central section and a downstream section associated respectively with first, second and third conveying means, the second means of which are designed to perform the following plate handling operations: transfer of each plate from the upstream section to the downstream section; rotation of each plate in its positional plane; alignment of a front part of the plates of each pair of plates.

In accordance with a further characteristic feature of the invention, the positioning and leveling machine also comprises a compression roller, arranged underneath and parallel to a leveling roller counter-rotating wih respect thereto and forming therewith a compression station able to perform leveling of the plates.

SHORT DESCRIPTION OF THE DRAWINGS

Further characteristic features and advantages of the present invention will emerge more clearly from the detailed description which follows of an example of embodiment, illustrated purely by way of a non-limiting example in the accompanying drawings, in which:

FIG. 4 shows in diagrammatic form a side view of the machine in question;

DETAILED DESCRIPTION OF PREFERRED EMBODIMENTS

With reference to the accompanying drawings, 1 denotes in its entirety the machine for positioning and leveling plates for electric accumulators according to the present invention.

Figure 1:
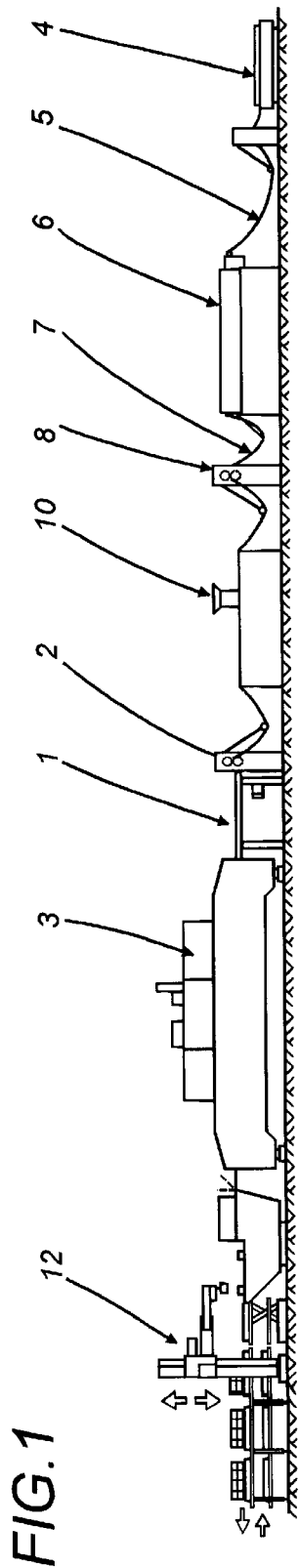
FIG. 1 shows in diagrammatic form a cycle for the production of plates for electric accumulators, within which the positioning and leveling machine according to the present invention is operationally inserted.

It is operationally arranged, as can be seen in FIG. 1, between a machine 2 for separating lead grids and an annealing furnace 3. The cycle for the production of plates for electric accumulators substantially envisages (see FIG. 1) the use of bobbins 4 onto which a strip of lead 5 is wound, said strip being made to pass through a machine 6 designed to achieve controlled expansion of the lead strip. This machine allows the production of a continuous strip 7 of grids, which is directed towards a finishing machine 8 designed to define the contours thereof, producing on one inner side 9 thereof lugs 13 for the electrical contacts. The production process also envisages the passage of the continuous strip 7 through a spreading machine 10 and the separating machine 2 able to divide the continuous strip 7 into individual grids called, at this point of the process, more appropriately plates 11. The individual plates 11 are then guided through the positioning and leveling machine 1 and then through the annealing furance 3 so as to be collected finally and stored by means of a suitable automated system 12.

More particularly, the separating machine 2 is designed to divide, by means of two counter-rotating separator rollers 14, the continuous strip 7 of grids into pairs of plates 11 divided from one another and substantially consisting of lead grids covered with a paste based on sulfuric acid and lead oxide and a sheet of paper arranged on both its lower and upper surfaces.

Figure 3B:
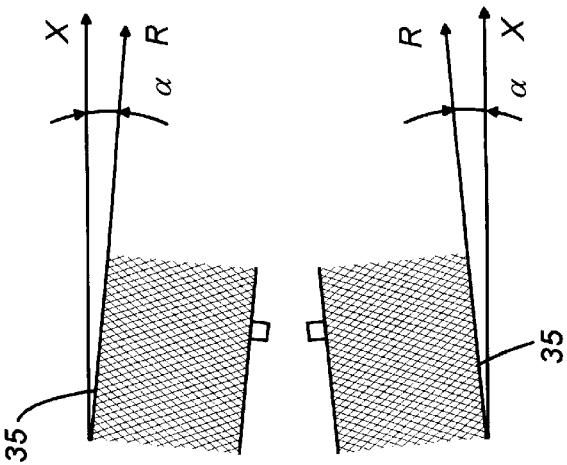
FIGS. 3a and 3b show in diagrammatic form how a pair of plates is arranged, respectively, before and after a central section of the machine in question.
Figure 3A:
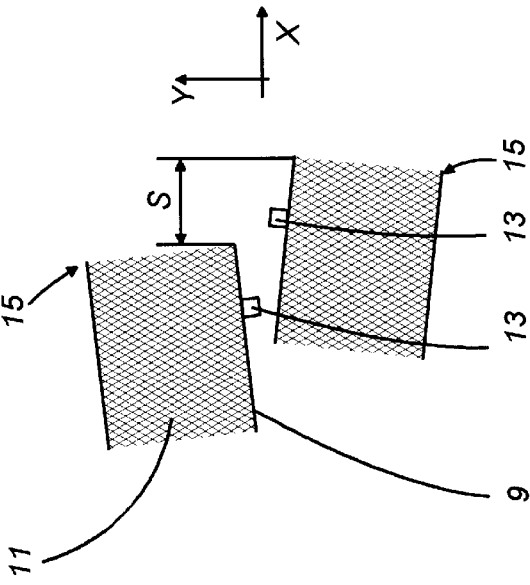
Figures 2A, 2B:
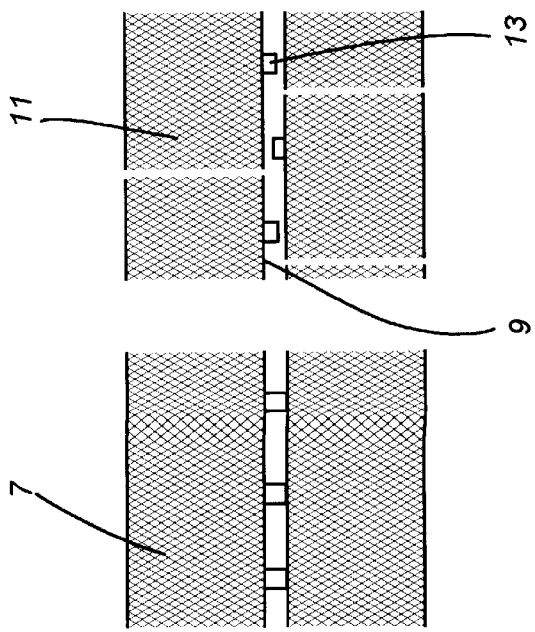
FIGS. 2a and 2b show in diagrammatic form a section of a strip of grids, in the continuous condition and divided into individual plates respectively.
Figure 5:
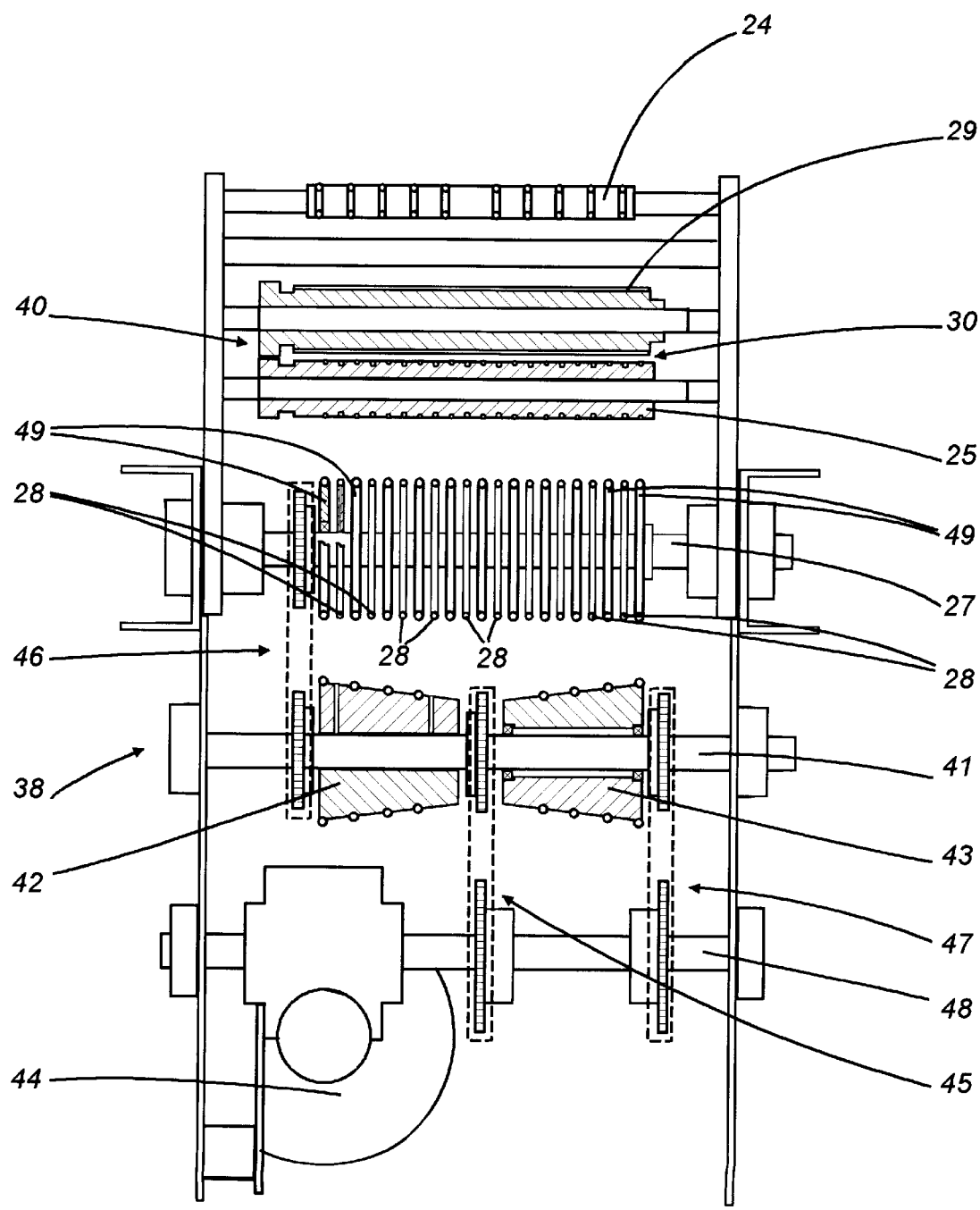
FIG. 5 shows in diagrammatic form a view of the machine in question sectioned along the plane indicated by V—V in FIG. 4.

The two plates of each pair of plates 11, when they emerge from the separating machine 2, are curved by the action of the aforementioned separator rollers 14, staggered at a distance S with respect to their direction of feeding X, and with their front parts 15 (in the direction of feeding) diverging from one another and inclined in a direction having a component along a transverse direction Y, as shown in FIG. 3a.

The positioning and leveling machine 1 has an upstream section 16 arranged in the vicinity of the outlet of the separating machine 2 and a downstream section 17 arranged in the vicinity of a charging hatch (not shown in the accompanying drawings) of the annealing furnace 3. The upstream section 16 is provided with first conveying means 18 designed to remove the plates from the outlet and transfer them, through a compression station 19 to a central section 20 of the positioning and leveling machine 1. The central section 20, in turn, is provided with second conveying means 21 designed to transfer the plates 11 from the first conveying means 18 to the downstream section 17. This latter section 17 is provided with third conveying means 22 which allow the transfer of the plates 11 from the central section 20 to the location for charging of the furnace 3.

The first conveying means 18 comprise a first series of parallel belts 23 mounted endlessly on an extraction roller 24 and a compression roller 25, and a second series of parallel belts 26 mounted endlessly on the compression roller 25 and on a first connecting shaft 27 arranged between the upstream section 16 and the central section 20 of the machine 1. The compression roller 25 drives by means of the first series of belts 23 the extraction roller 24 and is driven in turn by the first connecting shaft 27 by means of the second series of belts 26 wound around this shaft 27 by means of a first series of pulleys 28. The extraction roller 24 is arranged in the vicinity of the outlet of the separating machine 2 and has a sufficiently small diameter to allow insertion thereof as close as possible to the outlet of the separating machine 2.

More precisely, it is arranged at a distance L from an opening 51 defined by the mutual distance of the two separator rollers 14 of the separating machine 2. This distance L allows the plates 11 to be picked up by means of the first series of belts 23 when the plates 11 themselves are emerging from the two separator rollers 14 and are still arranged in a substantially horizontal position. In fact, as the plates gradually emerge from the separating machine, they tend (since they are not supported) to flex downwards, making even more problematic the picking-up thereof by means of the first series of belts 23 owing to jamming on the belts themselves.

The first series of belts 23 in turn has dimensions such they are able to rotate about a small radius of curvature such as that defined by the extraction roller 24.

The compression roller 25 is arranged underneath and parallel to a leveling roller 29 counter-rotating with respect thereto and forming together therewith the compression station 19. These two rollers 25 and 29 are connected together by a first transmission member consisting of a pair of toothed wheels 40 meshing together and keyed onto their respective shafts.

The plates are conveyed and supported by means of the first series of belts 23 from the outlet of the separating machine 2 as far as a slit 30 defined by the two rollers, i.e. the leveling roller 29 and the compression roller 25. The leveling roller 29 and the compression roller 25 grip respectively the upper and the lower surfaces of the plates 11 and cause them to pass through the slit 30. During this passing movement, the two rollers 25 and 29 exert a compressive action on the plates 11, designed to perform complete leveling of the plates 11 themselves.

The compression roller 25 and the leveling roller 29 grip the plates 11 when they have still not left the separating machine 2. It should be noted that the plates 11 of each pair of plates may have, at the outlet of the separating machine 2, connecting elements (such as filaments of paper) which tend to upset the arrangement of the plates when they are detached by the two separator rollers 14. Immediate gripping of the plates 11 in the vicinity of the outlet of the separating machine 2 by the compression roller 25 and the leveling roller 29 ensures the avoidance of possible displacements due to the presence of the aforementioned connecting elements.

The second series of belts 26 is intended to remove the plates 11, emerging from the slit 30, and transfer them to the second conveying means 21. The latter consist of two diverging series of parallel belts 31, 32 able to convey separately the plates 11 of each pair of plates, along the central section of the machine 1. In this way, the two diverging series of belts 31, 32 cause mutual spacing of the plates 11 in a transverse direction Y substantially perpendicular to the direction of feeding X of the plates 11 themselves. The two diverging series of belts 31, 32 are endlessly mounted on the first connecting shaft 27 and on a second connecting shaft 33. These two shafts 27 and 33 are arranged respectively upstream and downstream of the central section 20. The two diverging series of belts 31, 32 have two different feed speeds and correspondingly cause feeding, along the central section 20, of the two plates 11 of each pair of plates at different speeds. As a result of the different feeding speed imposed on the two plates 11, alignment of the front parts 15 thereof with respect to the second connecting shaft 33 may be performed.

Figure 6:
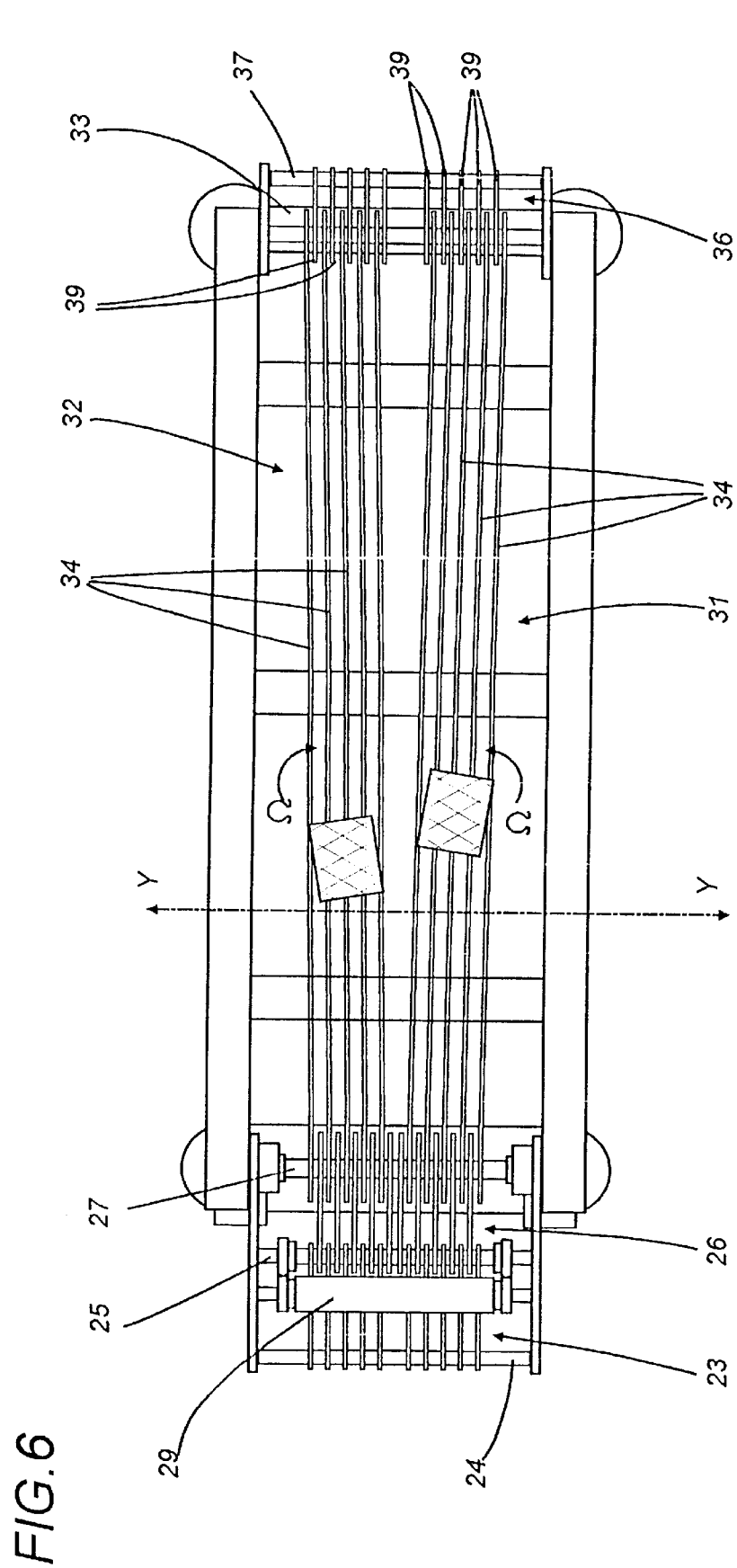
FIG. 6 shows in diagrammatic form a plan view of the machine according to FIG. 4.

The two diverging series of belts 31 and 32 have, moreover, a plurality of individual belts 34 (five belts each, see FIG. 6) having different feeding speeds. These speeds increase from one belt to another proceeding in the transverse direction Y from the inside towards the outside of the positioning and leveling machine 1, as indicated in FIG. 6 by the direction of the arrows. This means that each plate 11 undergoes, during transfer along the central section 20 of the machine 1, a rotation Ω in its positional plane, the external part of each plate in fact being more advanced with respect to the internal part.

The positional plane is defined by the resting surface defined by the two diverging series of belts 31, 32 in the section thereof intended for conveying of the plates, corresponding to the central section 20 of the machine 1 in question.

The plates 11 have, following the abovementioned rotation Ω, an external side 35 arranged in a direction R forming an angle α with respect to the direction of feeding X. As a result, the front part 15 of each plate 11 is inclined towards the inside of the machine 1 and hence towards the other plate 11 of the pair of plates.

The configuration which the pair of plates thus assume as far as the central section 20 (shown in 3b) is therefore suitable for achieving a perfect alignment of the external edges 35 of the plates. In fact, by means of a pair of fixed pins (not shown in the accompanying figures) arranged downstream of the central section 20 and designed to come slidingly into contact with the external edges 35 of the plates 11, which proceed in their direction of feeding X, it is possible to perform a precise counter-rotation of each plate, resulting in an alignment of the external edge 35 thereof in the feeding direction X. Advantageously, the pair of fixed pins may be arranged just before the location for stacking by the storage system 12.

When the plates reach the second connecting shaft 33, they are taken up by the third conveying means 22 consisting of a third series of parallel belts 36 mounted endlessly on the second connecting shaft 33 and on an expulsion roller 37. This third series of belts 36 is actuated by the second connecting shaft 33 and conveys the plates 11 along the downstream section 17 of the machine 1 as far as the charging hatch of the annealing furnace 3.

The first connecting shaft 27 and the two diverging series of belts 31 and 32 are driven by actuating means 38 and are able to drive, in turn, by means mechanical transmissions, the compression roller 25, the leveling roller 29, the extraction roller 24, the second connecting shaft 33 and the expulsion roller 37.

The actuating means 38 comprise a countershaft 41 which transmits the movement to the first connecting shaft 27 by means of a second flexible transmission member 46.

The two diverging series of belts 31, 32 are partially wound onto two corresponding series of idle pulleys 49 mounted coaxially on the first connecting shaft 27 and on two corresponding second series of pulleys 39 mounted coaxially on the second connecting shaft 33. They are driven separately from one another. A first series 31 is in fact driven by an actuating roller 42 keyed onto the countershaft 41, while a second series 32 is driven by an idle roller 43 mounted coaxially on the countershaft 41 and actuated, by means of a third flexible transmission member 47, by a tranmission shaft 48 connected to a motor 44. The countershaft 41 is actuated by the transmission shaft 48 via a fourth flexible transmission member 45. The actuating roller 42 and the idle roller 43 are provided with radial grooves for insertion of the two diverging series of belts 31, 32 and have a diameter increasing from the outside towards the inside of the machine 1 (along the transverse direction Y) so as to produce speeds for the outermost belts higher than those of the innermost belts. The idle roller 43 is actuated moreover so as to rotate at a different speed from that of the actuating roller 42 so as to produce different speeds for the two series of belts 31, 32.

Finally, therefore, each belt 34 forming part of the two diverging series 31, 32 has its own feed speed so as to perform the following handling operations of the plates 11:

a) transfer of the pairs of plates 11 from the upstream section 16 to the downstream section 17;

b) mutual spacing of the plates of each pair in the transverse direction Y;

c) alignment of the front part 15 of the plates 11 of each pair;

d) rotation (Ω) of each plate 11 in its positional plane with possible further alignment of the external edge 35 in the feeding direction X.

The speed of the continuous strip 7 of grids varies during the transitory condition imposed by switching on and switching off of the plant for production of the plates 11. For this reason, the positioning and leveling machine 1 in question also envisages the use of a speed tracking device (not shown) designed to make the speed of the motor 44 dependent upon the speed of the continuous strip 7 of grids so as to maintain constant spacing between the plates 11 inside the machine 1 itself.

What is claimed:

1. Machine for positioning and leveling plates for electric accumulators, of the type operationally arranged downstream of a machine for separating lead grids (2), initially formed as a continuous strip (5), into pairs of plates (11), having an outlet associated with an upstream section (16) of said positioning and leveling machine, said upstream section (16) being provided with first conveying means (18) designed to remove the plates (11) from the said outlet and transfer them, through a compression station (19) designed to level the plates (11) themselves, to a central section (20) of said positioning and leveling machine, said central section (20) in turn being provided with second conveying means (21) designed to transfer the plates (11) from said first conveying means (18) to third conveying means (22) designed to remove the plates (11) from said central section (20) and convey them along a downstream section (17) of said positioning and leveling machine, said second conveying means (21) comprising at least two diverging series of parallel belts (31, 32) able to perform mutual spacing of the plates (11) in a transverse direction (Y) substantially perpendicular to the direction of feeding (X) thereof, wherein said first conveying means (18) comprise: at least a first series of parallel belts (23) mounted endlessly on at least two rollers, one being an extraction roller (24) arranged in the vicinity of the outlet of the said separating machine (2) and the other a compression roller (25) arranged underneath and parallel to a leveling roller (29) counter-rotating with respect thereto and defining therewith a slit (30), said compression roller (25) and said leveling roller (29) being arranged in the region of said compression station (19) and being designed to drive the plates (11), conveyed and supported by said first series of belts (23), through said slit (30), thus causing leveling of the plates (11) themselves; at least one second series of parallel belts (26) mounted endlessly on said compression roller (25) and on a first connecting shaft (27) arranged between said upstream section (16) and said central section (20), said second series of belts (26) being designed to remove the plates (11) emerging from said slit (30) and transfer them to said second conveying means (21); wherein each belt (34) of said two diverging series of belts (31, 32) is mounted endlessly on said first connecting shaft (27) and on at least one second connecting shaft (33) arranged downstream of said central section (20) and has its own feeding speed designed to perform the following additional handling operations of the plates (11): rotation (Ω) of each plate (11) in its positional plane defined by the supporting surface formed by said two diverging series of belts (31, 32) in the section intended for conveying of the plates (11); alignment of a front part (15) of the plates (11) of each said pair designed to arrange the plates (11) themselves in a condition for easy collection.

2. Machine for positioning and leveling plates as claimed in claim 1, wherein said two diverging series of belts (31, 32) have different speeds so as to cause feeding of the plates (11) along said central section (20) at different speeds so as to perform alignment of said front part (15) of the plates (11) with respect to said second connecting shaft (33).

3. Machine for positioning and leveling plates as claimed in claimed in claim 1, wherein each diverging series of belts (31, 32) has a plurality of individual belts (34) having different feeding speeds increasing with respect to one another in said transverse direction (Y) from the inside towards the outside of said positioning and leveling machine, each said diverging series (31, 32) causing thereby rotation (Ω) of each plate (11) in its positional plane.

4. Machine for positioning and leveling plates as claimed in claim 3, wherein said rotation (Ω) is designed to arrange a same external side (35) of the plates (11) parallel to the direction of feeding (X) thereof.

5. Machine for positioning and leveling plates as claimed in claim 4, wherein said rotation (Ω) is designed to arrange a same external side (35) of the plates inclined at angle (α) with respect to said feeding direction (X).

6. Machine for positioning and leveling plates as claimed in claim 1, wherein said third conveying means (22) consist of a third series of parallel belts (36) endlessly mounted on said second connecting shaft (33) and on at least one expulsion roller (37), said third series of belts (36) being designed to remove the plates (11) from said third conveying means (22) and displace them along said downstream section (17) of said positioning and leveling machine.

7. Machine for positioning and leveling plates as claimed in claim 1, wherein said compression roller (25) and said leveling roller (29) grip the two—upper and lower—faces of the plates (11), when the plates (11) have still not left said separating machine (2).

8. Machine for positioning and leveling plates as claimed in claim 1, wherein said first connecting shaft (27) and said two diverging series of belts (31, 32) are driven by actuating means (38), said two diverging series of belts (31, 32) being able to be driven, in turn, by means of mechanical transmissions, said compression roller (25), said leveling roller (29), said extraction roller (24) and said second connecting shaft (33).

9. Machine for positioning and leveling plates as claimed in claim 1, wherein said first connecting shaft (27) drives said compression roller (25) by means of said second series of belts (26).

10. Machine for positioning and leveling plates as claimed in claim 1, wherein said compression roller (25) drives said extraction roller (24) by means of said first series of belts (23), and said leveling roller (29) by means of a first transmission member (40).

11. Machine for positioning and leveling plates as claimed in claim 10, wherein said first transmission member (40) consists of a pair of toothed wheels meshing with one another, one being keyed onto the shaft of said compression roller (25) and the other one being keyed onto the shaft of said leveling roller (29).

12. Machine for positoning and leveling plates as claimed in claim 8, wherein said actuating means (38) comprise a countershaft (41) designed to transmit the movement to said first connecting shaft (27) by means of a second transmission member (46).

13. Machine for positioning and leveling plates as claimed in claim 1, wherein said two diverging series of belts (31, 32) are endlessly wound onto two corresponding series of idle pulleys (49) mounted coaxially on said first connecting shaft (27) and around two corresponding second series of pulleys (39) mounted coaxially on said second connecting shaft (33).

14. Machine for positioning and leveling plates as claimed in claim 8, wherein said actuating means (38) drive said two diverging series of belts (31, 32), a first (31) of which by means of an actuating roller (42) keyed onto said countershaft (41), and a second one (32) of which by means of an idle roller (43) mounted coaxially on said countershaft (41) and actuated via a third transmission member (47) by a transmission shaft (48) connected to a motor (44).

15. Machine for positioning and leveling plates as claimed in claim 14, wherein said countershaft (41) is actuated by said transmission shaft (48) by means of a fourth transmission member (45).

16. Machine for positioning and leveling plates as claimed in claim 13, wherein said second connecting shaft (33) is actuated by at least one of the two diverging series of belts (31, 32), which is wound onto said second series of pulleys (39) keyed onto said second connecting shaft (33).

17. Machine for positioning and leveling plates as claimed in claim 6, wherein said second connecting shaft (33) drives said expulsion roller (37) by means of said third series of belts (36) endlessly wound onto said second connecting shaft (33) and onto said expulsion roller (37).

18. Machine for positioning and leveling plates as claimed in claim 1, wherein said extraction roller (24) is arranged at a distance L from an opening (51) defined by two separator rollers (41) of said separating machine (2), said distance L being designed to allow gripping of said plates (11) by means of said first series of belts (23) when the plates (11) themselves are arranged in a substantially horizontal position.

* * * * *